United States Patent [19]
Moschetta

[11] 3,752,583
[45] Aug. 14, 1973

[54] MODIFIED SYNCHROSCOPE

[76] Inventor: Joseph Moschetta, 535 Dixie Dr., Penn Hills, Pa. 15325

[22] Filed: Sept. 9, 1971

[21] Appl. No.: 178,863

[52] U.S. Cl. .................... 356/23, 324/91, 356/25
[51] Int. Cl. ............................................. G01r 25/00
[58] Field of Search ................ 324/91; 356/23, 25

[56] References Cited
UNITED STATES PATENTS

| | | | |
|---|---|---|---|
| 1,936,774 | 11/1933 | Sparkes | 324/91 X |
| 2,114,714 | 4/1938 | Kalsey | 324/91 X |
| 2,166,833 | 7/1939 | Wilfart | 324/91 X |

Primary Examiner—Ronald L. Wibert
Assistant Examiner—F. L. Evans

[57] ABSTRACT

An electrical synchroscope, modified to accomodate a light source and a light sensitive device, both mounted on a vertically adjustable mechanism and facing each other through a slot in the dial of the synchroscope so that as the instrument pointer rotates it can block the light rays from the light sensitive device at different indicated points on the dial, this in turn initiating an externally operated electrical circuit.

4 Claims, 4 Drawing Figures

SECTION A-A

MODIFIED SYNCHROSCOPE

This invention generally relates to synchroscopes and more specifically to the use of a modified synchroscope not only as the indicator, but, also as the initiator of the circuit that is used to parallel two electrical generators. The synchroscope is basically a phase angle meter and when properly connected its pointer will rotate in the fast or clockwise direction with the incoming generator running faster than the bus voltage. Also, the synchroscope pointer will rotate in the slow or counter clockwise direction with the incoming generator running slower than the bus voltage. The inventor feels that since a synchroscope is used to indicate the frequency condition between two electrical sources, the same instrument, with certain modifications, could be used to initiate a closing circuit in automatic synchronizing systems. In addition, the synchroscope will indicate the phase angle between two like frequencies if one does exist. Automatic synchronizers of different types are readily available but some have limitations which the idea under discussion can overcome. For example, some automatic synchronizers will not respond to a phase displacement condition when the two frequencies are equal. Also, practically none indicate and initiate the closing circuit using the same instrument for both functions. In addition, the modified synchroscope to be described makes use of relatively inexpensive clapper type relays and commonly used time delay relays.

It is apparent that since the synchroscope pointer rotates in a full circle its shaft is the center of the circle. Also, the the shaft is one end of the radius. As the pointer rotates, the intersection of the radius and the pointer will take place sooner at point on the pointer that is nearer the center of the circle than a point closer to the end of the rotating pointer. If a point is placed on the radius and its position made adjustable, the pointer will intersect this point at different angles on the dial. If a light sensitive cell is placed on the radius and its position made adjustable, it can be seen that light interruption will take place at different angles depending on the position of the light sensitive cell. If the light rays to the light sensitive cell can be interrupted at different angles on the dial of the modified synchroscope than a circuit, properly connected, can be controlled at different points.

One object of this invention is to show the use of the modified synchroscope as the initiating element in an automatic synchronizing circuit at a preset point indicated on the dial of the instrument.

A further object of this invention is to show that the modified synchroscope can initiate an automatic synchronizing circuit at a preset point with its pointer rotating in the fast or clockwise direction.

A further object of this invention is to show that the modified synchroscope can initiate an automatic synchronizing circuit at a preset point with its pointer rotating in the slow or counter clockwise direction.

A further object of this invention is to show that the modified synchroscope can initiate an automatic synchronizing circuit at an indicated preset point on and from the the fast side of the dial to a similar point indicated on the slow side of the dial.

A further object of this invention is to show that the modified synchroscope can initiate an automatic synchronizing circuit at an indicated preset point on and from the slow side of the dial to a similar point on the fast side of the dial.

A further object of this invention is to show that the modified synchroscope can initiate an automatic synchronizing circuit at an indicated position on either side of the dial when a phase displacement exists between two generators of equal frequencies.

A further object of this invention is to show that this idea could be applied to other instruments to permit them not only to indicate but also to effect changes in circuits with which they are associated.

Other objects and advantages will become apparent from the following description and drawings wherein a satisfactory embodiment of the invention is shown. However, the invention is not limited to the details disclosed, but includes all variations and modifications as fall within the spirit of the invention and the scope of the appended claims.

Figure 1:
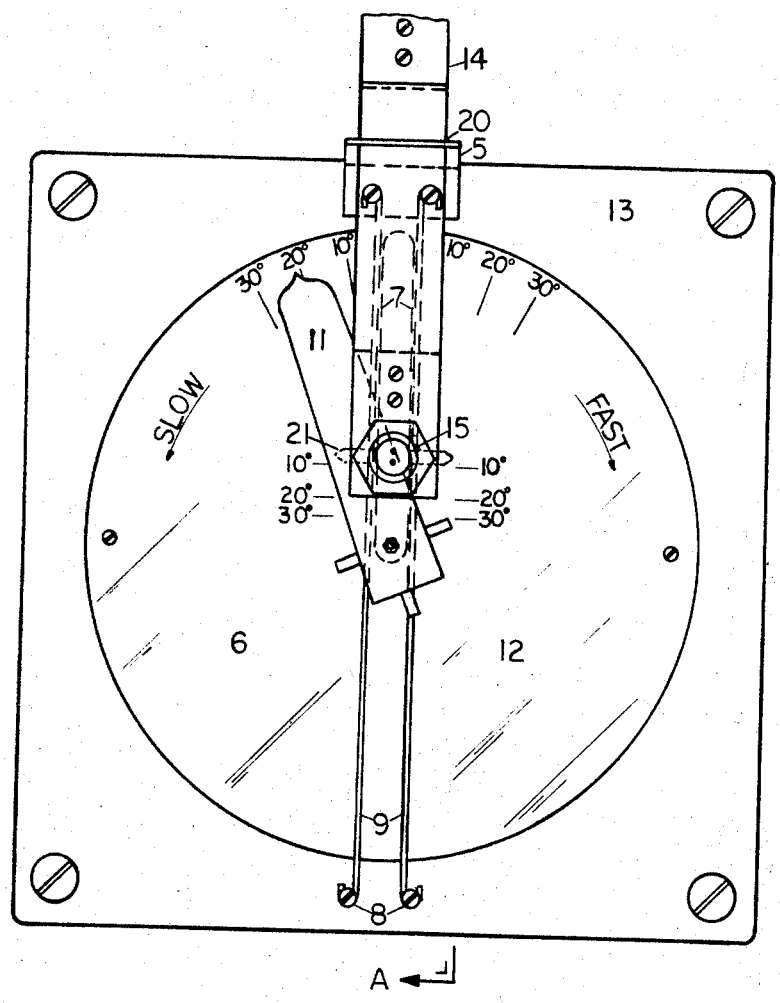
FIG. 1 is a front elevational view showing the embodiment of the present invention.
Figure 4:
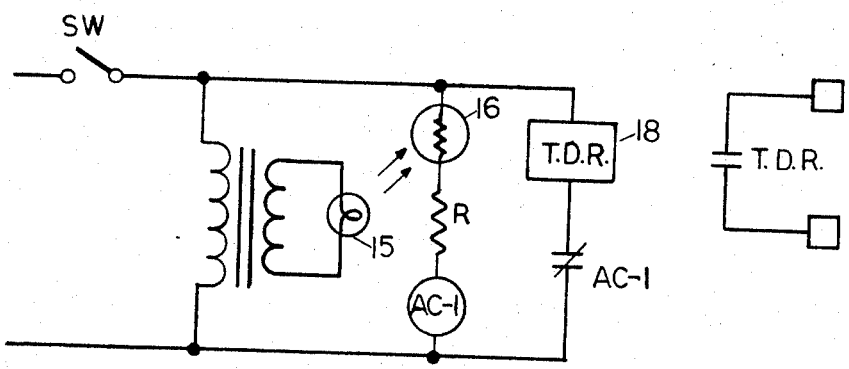
FIG. 4 is the sample electrical circuit used to prove the intent of the invention.
Figure 2:
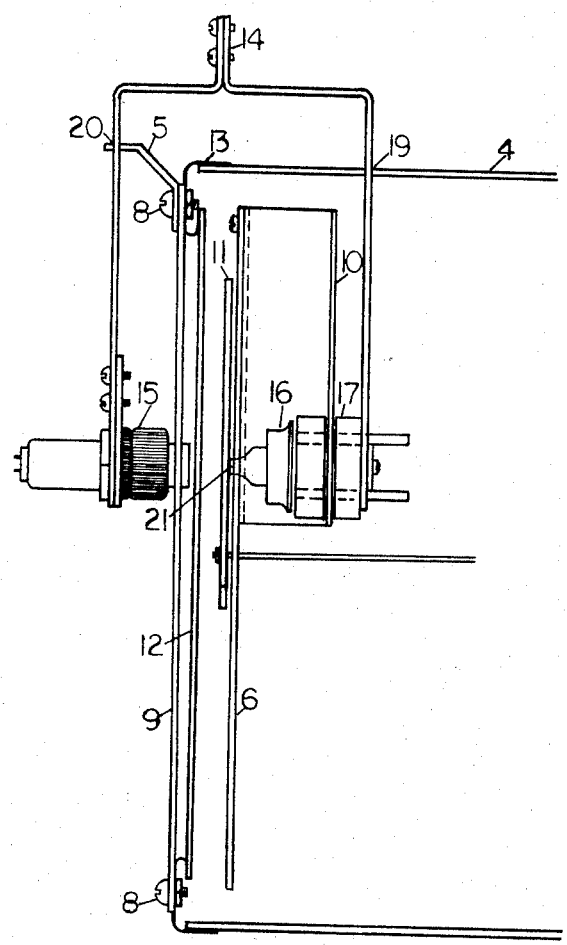
FIG. 2 is a cross sectional view taken along A—A of FIG. 1.
Figure 3:
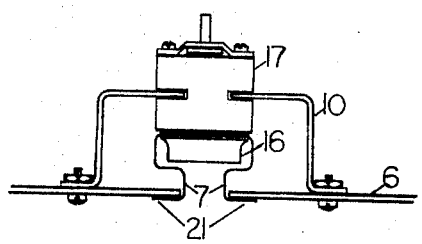
FIG. 3 is a top cross sectional view of the inside guide structure shown in FIG. 2.

According to this invention the number 4 represents the modified synchroscope proper as shown in FIGS. 1, 2, and 3. The modified synchroscope 4 includes dial 6 with a dial slot 7 through which light source 15 plays on the light sensitive cell 16. The adjustable mechanism 14 is made such as to slide up and down in slot 19 of the modified synchroscope 4 and slot 20 of bracket 5 which is fastened to the outside of the cover 13 of the modified synchroscope 4. Screws 8 secure the outside guide wires 9 to the cover 13 of the modified synchroscope 4. Inside guide 10 shown in FIGS. 2 and 3 is made of two pieces of formed metal fastened to dial 6 permitting the slotted base 17 on which is secured light sensitive cell 16 and indicator 21 to track vertically within the range of the adjustable mechanism 14. The light sensitive cell 16, shown in FIGS. 1, 2, and 3, from inside the modified synchroscope 4 faces the dial slot 7 and is in line with light source 15 which is fastened to the adjustable mechanism 14, as shown in FIGS. 1 and 2. Obviously, the case of the conventional synchroscope will have to be enlarged to accomodate the described details and make possible the modification. Nothing is done to glass 12, it being a part of cover 13. It must be recognized that although light 15 and light sensitive cell 16 are shown in FIG. 4 they are a mechanical part of the modified synchroscope 4. Flexible leads from the light source 15 and light sensitive cell 16 make possible their connections to the proper points as shown in the schematic of FIG. 4. It is obvious that when the adjustable mechanism 14 is moved, that is, raised or lowered, both the light source 15 and the light sensitive cell 16 will move in unison. The width of pointer 11 and its cross section, shown in the form of a U result in good light masking. Also, the shape of the pointer 11 will determine the placement of the calibration points along dial slot 7 and the marks around the periphery of dial 6. When the indicator 21 is set at the 10° point, for example, pointer 11, when rotating, will mask the light sensitive cell 16 at the 10° point on either side of dial 6 and that space in between the two 10° points on the upper quandrants of dial 6.

The sample circuit in FIG. 4 is composed of switch SW, a six volt secondary transformer T-1 that energizes the light source 15 whose rays play on the light sensitive cell 16 which in turn is in series with the relay AC-1 and a current limiting resistor. The open contact of relay AC-1 controls the circuit to energize the time delay relay T. D. R. whose shown open contact ultimately initiates the closing of the circuit to the breaker that will place the incoming generator in parallel with the running generator. The T. D. R. setting is based on the time required for the particular breaker to close and to insure circuit stabilization. However, the relay T. D. R. is not a part of the invention proper. It appears redundant to explain many of the conditions relating to synchronizing in as much as those knowledgeable in the art are familiar with the pertinent facts. The flexible leads for both the light source 15 and light sensitive device 16 are connected to their respective circuits, the light source 15 to the secondary of transformer T and the light sensitive cell 16 to the resistor and one side of the 110 volts line. The remainder of the elements in FIG. 4 are connected as shown and the entire circuit is energized at 110 volts, 60 cycles when switch SW. is closed.

The following description refers to a specific setting of the adjustable mechanism 14, for example, 10°. This is accomplished by moving the adjustable mechanism 14 until the indicator 21 points to the 10° mark located on either side of dial slot 7. Let us assume that the pointer 11 is rotating in the fast or clockwise direction which means that the incoming generator is running faster than the system generator. Of course the circuit in FIG. 4 is energized. Light masking will take place from the 10° position on the slow side of dial 6 of the modified synchroscope 4 to the 10° position on the fast side of dial 6. At the same time that this light masking takes place relay AC-1 is deenergized for 20°. This is the angle between the two 10° positions on dial 6. Relay AC-1 is energized during the remainder of the pointer 11 travel about dial 6, this being in this case, 340°. Now let us assume that pointer 11 is rotating in the slow or counter clockwise direction which means that the incoming generator is running slower than the system generator. Light masking will take place from the 10° position on the fast side of dial 6 of the modified synchroscope 4 to the 10° position on the slow side of dial 6. At the same time that this light masking takes place relay AC-1 is again deenergized for 20°. Again, this is the angle between the two 10° positions on dial 6. Relay AC-1 is energized during the remainder of the pointer 11 travel about dial 6 and again, this is 340°. It can be seen from the above description that the action on the light sensitive cell 16 by the rotating pointer 11 is the same for both directions of rotation.

It is obvious that if the positions of the light source 15 and the light sensitive cell 16 were reversed on the adjustable mechanism 14 the action would be the same as described above. Having recognized the action of the modified synchroscope 4 in the previous discussion the following description will include it and the circuit shown in FIG. 4.

The adjustable mechanism is moved to place indicator 21 at the 10° point on dial 6 and relay T. D. R. is set at 0.5 second. Two voltages are applied to the modified synchroscope 4, one representing the running voltage and the other representing the incoming voltage. This will cause the pointer 11 to rotate in the fast or clockwise direction since we have endeavored to make the incoming generator to run faster than the running generator. As the pointer 11 rotates relay AC-1 is deenergized from the 10° point on the slow side of dial 6 to the 10° point on the fast side of the dial causing contact AC-1 to close for this period. Relay T.D.R. is energized for the same length of time, this being, 20°. If the travel time of pointer 11 within the 20° of space on dial 6 is less than the T. D. R. setting of 0.5 second, then contact T. D. R. remains open as shown in FIG. 4. If, as the two voltages more closely approach synchronism and pointer 11 rotates at a slower speed, the time span of pointer 11 to travel from the 10° point on the slow side of dial 6 to a similar point on the fast side of the dial may be equal to or greater than the T. D. R. setting of 0.5 second. If this time is equal to or longer than the T. D. R. setting, relay the T. D. R. will function to cause contact T. D. R. to close and this in turn will initiate a closing in the breaker circuit. If pointer 11 comes to rest in the area between the two 10° positions and its elapsed time in this area is equal to or greater than the T. D. R. setting of 0.5 second a breaker closing will be effected as in the above example. When pointer 11 is rotating in the fast or clockwise direction relay AC-1 is energized from the 10° point on the slow side of the dial 6 to the 10° point on the fast side of the dial. This results in a total of 340° that relay AC-1 is energized, during which time the contact AC-1 is open, removing relay T. D. R. from the circuit. The above described action will be the the same when the incoming generator is running slower than the bus voltage, except for the minor details noted below. Pointer 11 will rotate in the counter clockwise direction and its light masking action on the light sensitive cell 16 will be from the fast side of dial 6 to the slow side of the dial. The direction of rotation of pointer 11 does not alter its effect on the light sensitive cell 16. It should be obvious that at any other setting, 20°, 30°, etc., the action will be similar as described above except that more latitude is afforded the drop out of relay AC-1 when the indicator 21 setting is at an angle greater than 10°. For example, with the setting at 20° relay AC-1 will be deenergized for a total of 40°, and be energized for 320°. In the area outside of the indicator 21 setting of the modified synchroscope 4 all action as far as a breaker closing is concerned is nullified.

In systems where the frequencies are similar but a phase angle exists the modified synchroscope 4 functions just as in the above description. If we connect the modified synchroscope 4 to two sources having similar frequencies but, also having a phase angle difference pointer 11 will rotate to a point on dial 6 that is indicative of that phase angle. Let us assume all settings as previously described and all circuits energized, Pointer 11 will now rotate to a point on dial 6 that represents the phase angle between the two voltage sources and here it will remain. If pointer 11 is outside of the area of the two 10° positions nothing will happen, relay AC-1 will remain energized thus keeping contact AC-1 open. As a result relay T. D. R. is not energized. However, if pointer 11 rests at a spot within the two 10° positions relay AC-1 will become deenergized because of the light masking of the pointer 11. If the elapsed time of pointer 11 resting at this position is equal to, or greater than the 0.5 second setting of the relay T. D. R.

the contact T. D. R. will close setting up a breaker closing circuit. This action is the same as in the previous example except that pointer 11 came to rest almost immediately. Also, with different settings of indicator 21 such as 20°, 30°, etc., the modisynchroscope 4 will function as before.

Having understood the description of the novel idea it should be apparent that the same system could be incorporated in other fields. For example, a zero center power factor meter could be used to initiate a breaker tripping or an alarm circuit if the power factor became intolerable. Also, it is conceivable that the idea could be used in systems other than those used in eletrical circuits.

What I claim as new and desire to protect by Letters Patent in the United States is:

1. A device having a rotating member mounted on an axis and rotating in a circle, the center of which is the said axis, also comprising an adjustable mechanism to which is affixed a radiation source member, a radiation sensitive member, and an indicator, said radiation source member and said radiation sensitive member always facing each other such as to permit the said rotating member to pass between them blocking the radiations from the said radiation source member to the said radiation sensitive member, said radiation source member, said radiation sensitive member, and said indicator, all moving in unison when said adjustable mechanism is moved on a track which is along the radius of the said circle formed by the said rotating member, one extreme being close to the center of the said circle the other extreme being in the vicinity of the periphery of the said circle, said rotating member blocking radiations from said radiation source member to said radiation sensitive member at points indicated on a suitable surface along said radius of said circle by said indicator, said points coinciding with other points angularly disposed from said radius and indicated by said rotating member, said position of said blocking being determined by the position of said adjustable mechanism along said track, said blocking of said radiations from said radiation source member to said radiation sensitive member causing resistive changes in said radiation sensitive member, said radiation sensitive member being connected to a relay whose contact configuration is such as to permit it to open or close circuits, said resistive changes in said radiation sensitive member controlling flow through or voltage across said relay, enabling said contacts of said relay to open or close circuits.

2. A device as in claim 1 whose suitable surface has a slot through which said radiation source member directs said radiations on said radiation sensitive member, said slot coinciding with said radius and said track positions, said slot having along its edges indications properly oriented to which said ajdustable mechanism is set for predetermination of points at which said rotating member will block said radiations from said radiation source member to said radiation sensitive member.

3. A device having a radiation source member, a radiation sensitive member, and an indicator, all affixed to an adjustable mechanism and all moving in unison about an arc when said adjustable mechanism is moved, said radiation sensitive member being connected to a relay whose contact configuration is such as to enable the contacts to open or close circuits, said radiation source member and said radiation sensitive member always facing each other such as to permit a rotating member to pass between the said radiation source member and the said radiation sensitive member, blocking radiations from said radiation source member to said radiation sensitive member, said movement of said adjustable mechanism permitting said indicator to indicate the position of points properly oriented on a suitable surface said rotating member will pass between said radiation source member and said radiation sensitive member, blocking said radiations from said radiation source member to said radiation sensitive member causing resistive changes in said radiation sensitive member, said resistive changes controlling current through and voltage across said relay, said contacts having capabilities of closing or opening circuits.

4. A device as in claim 3 whose suitable surface has a slot through which said radiation source member directs said radiations on radiation sensitive member, said slot having points properly oriented along its edges to indicate the position said rotating member will pass between said radiation source member and said radiation sensitive member, blocking said radiations.

* * * * *